United States Patent
Moreau-Gobard

(10) Patent No.: US 7,542,595 B2
(45) Date of Patent: Jun. 2, 2009

(54) VIRTUAL ORGAN UNFOLDING FOR VISUALIZATION

(75) Inventor: Romain Moreau-Gobard, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 591 days.

(21) Appl. No.: 10/910,665

(22) Filed: Aug. 3, 2004

(65) Prior Publication Data

US 2005/0058328 A1    Mar. 17, 2005

Related U.S. Application Data

(60) Provisional application No. 60/492,394, filed on Aug. 4, 2003.

(51) Int. Cl.
*G06K 9/00* (2006.01)
(52) U.S. Cl. ........................ 382/128; 345/419
(58) Field of Classification Search ............... 382/154, 382/128; 345/419
See application file for complete search history.

(56) References Cited

U.S. PATENT DOCUMENTS

| | | | |
|---|---|---|---|
| 7,233,329 B2 * | 6/2007 | Moreau-Gobard ........... 345/424 |
| 7,233,330 B2 * | 6/2007 | Moreau-Gobard et al. .. 345/424 |
| 2001/0031920 A1 * | 10/2001 | Kaufman et al. ............ 600/431 |
| 2002/0164060 A1 * | 11/2002 | Paik et al. .................... 382/128 |
| 2002/0164061 A1 * | 11/2002 | Paik et al. .................... 382/131 |
| 2004/0236549 A1 * | 11/2004 | Dalton .......................... 703/2 |
| 2005/0018888 A1 * | 1/2005 | Zonneveld .................... 382/128 |
| 2005/0058328 A1 * | 3/2005 | Moreau-Gobard ........... 382/128 |
| 2005/0099416 A1 * | 5/2005 | Moreau-Gobard et al. .. 345/419 |
| 2005/0105786 A1 * | 5/2005 | Moreau-Gobard et al. .. 382/128 |
| 2005/0148859 A1 * | 7/2005 | Miga et al. ................... 600/410 |
| 2006/0235294 A1 * | 10/2006 | Florin et al. ................. 600/425 |
| 2008/0175459 A1 * | 7/2008 | Geiger et al. ................ 382/131 |

OTHER PUBLICATIONS

VirEn: A Virtual Endoscopy System—Anna Vilanova, Andreas Konig, Eduard Groller—Machine Graphics & Vision. vol. 8, No. 3, 1999, pp. 469-487.*
Data Visualization 2001—Proceedings of the Joint Eurographics—IEEE TCVG Symposium on Visualization in Ascona, Switzerland. May 28-30, 2001. D. Ebert, J.M. Fauze and R. Peikert. pp. 127-136.*
A. Vilanova Bartroli, R. Wegenkittl, A. König, and E. Gröller, "Virtual Colon Unfolding", published at IEEE Visualization 2001.*

(Continued)

*Primary Examiner*—Matthew C. Bella
*Assistant Examiner*—Sath V. Perungavoor
(74) *Attorney, Agent, or Firm*—Donald B. Paschburg; F. Chau & Associates, LLC

(57) ABSTRACT

A system and method for organ image unfolding for feature visualization are provided, where the system includes a processor, an imaging adapter in signal communication with the processor for receiving organ scan data, a modeling unit in signal communication with the processor for fitting a model to the scan data, and an unfolding unit in signal communication with the processor for unfolding the 3D modeled scan data; and the corresponding method includes segmenting an outer surface of the organ, parameterizing a 3D model of the organ, ray-casting from the center of the organ to the surface of the 3D model, and unfolding the 3D model of the organ in correspondence with the ray-casting.

18 Claims, 9 Drawing Sheets

OTHER PUBLICATIONS

Vilanova Bartroli A., et al. "Virtual Colon Flattening" Proceedings IEEE TCVG Symposium on Visualization, May 2001 pp. 127-136, XP008039708.

Vilanova A. König et al., "VirEn: A Virtual Endoscopy System," Machine Graphics and Vision, vol. 8, No. 3, 1999, pp. 469-487, XP008039662.

Vilanova Bartroli A. V. et al., "Nonlinear Virtual Colon Unfolding" Proceedings Visualization 2001 IEEE Piscatawy, NJ USA, Oct. 24-26, 2001, pp. 411-418, 579 XP002308883.

Guo J., et al. "Rendering the Unfolded Cerebral Cortex," Medical Image Computing and Computer-Assisted Intervention. MICCAI. International Conference. Proceedings, Sep. 19, 1999, pp. 287-296 XP001033496.

Figueiredo O., et al., "Parallel unfolding and visualization of curved surfaces extracted from large three-dimensional volumes," Journal of Electronic Imaging SPIE-INT. Soc. Opt. Eng USA, vol. 11, No. 4, Oct. 2002 pp. 423-433, XP002308884.

International Search Report.

* cited by examiner

VIRTUAL ORGAN UNFOLDING FOR VISUALIZATION

CROSS-REFERENCE TO RELATED APPLICATION

This application claims the benefit of U.S. Provisional Application Ser. No. 60/492,394, filed Aug. 4, 2003 and entitled "Heart Unfolding for Coronary Visualization", which is incorporated herein by reference in its entirety.

BACKGROUND

Medical image scanning data, for example, is typically obtained in the form of slices in various types of imaging modalities. These slices are then stacked to form a three-dimensional ("3D") volume. This volume must then be visualized and segmented.

In current approaches to medical image scanning, researchers have developed a wide variety of segmentation techniques for isolating heart coronary arteries. Research in this field is motivated by the high number of patients suffering from coronary artery disease. Heart coronary arteries are typically difficult to segment because of their size and proximity to the surface of the heart and blood pool.

Accordingly, what is needed is a system and method capable of Heart Unfolding for Coronary Visualization. The present disclosure addresses these and other issues.

SUMMARY

These and other drawbacks and disadvantages of the prior art are addressed by an apparatus and method of heart unfolding for coronary visualization.

A system for organ image unfolding for feature visualization includes a processor, an imaging adapter in signal communication with the processor for receiving organ scan data, a modeling unit in signal communication with the processor for fitting a model to the scan data, and an unfolding unit in signal communication with the processor for unfolding the 3D modeled scan data.

A corresponding method for organ image unfolding for feature visualization includes segmenting an outer surface of the organ, parameterizing a 3D model of the organ, ray-casting from the center of the organ to the surface of the 3D model, and unfolding the 3D model of the organ in correspondence with the ray-casting.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an apparatus and method of Heart Unfolding for Coronary Visualization, in accordance with the following exemplary figures, in which.

DETAILED DESCRIPTION OF PREFERRED EMBODIMENTS

In accordance with preferred embodiments of the present disclosure, a system and method of Heart Unfolding for Coronary Visualization are described herein. The method allows a user to better visualize the heart coronaries and vessels on the surface of the heart.

In recent decades, researchers have developed a wide variety of segmentation techniques for isolating heart coronary arteries. Research in this field is motivated by the high number of patients suffering from coronary artery disease. Heart coronary arteries are typically difficult to segment because of their size and proximity to the surface of the heart and blood pool.

Because of the difficulty with segmentation, and because of the proximity of coronary arteries to the surface of the heart, a surface unfolding approach can be used to overcome the visualization problem to some degree. This technique provides a great improvement for visualization of the heart coronary arteries.

The presently disclosed method incudes "unfolding" the surface of the heart and creating a Maximum Intensity Projection (MIP) of this surface. The result is a 2D map of the surface of the heart, containing the peripheral vessels.

Figure 1:
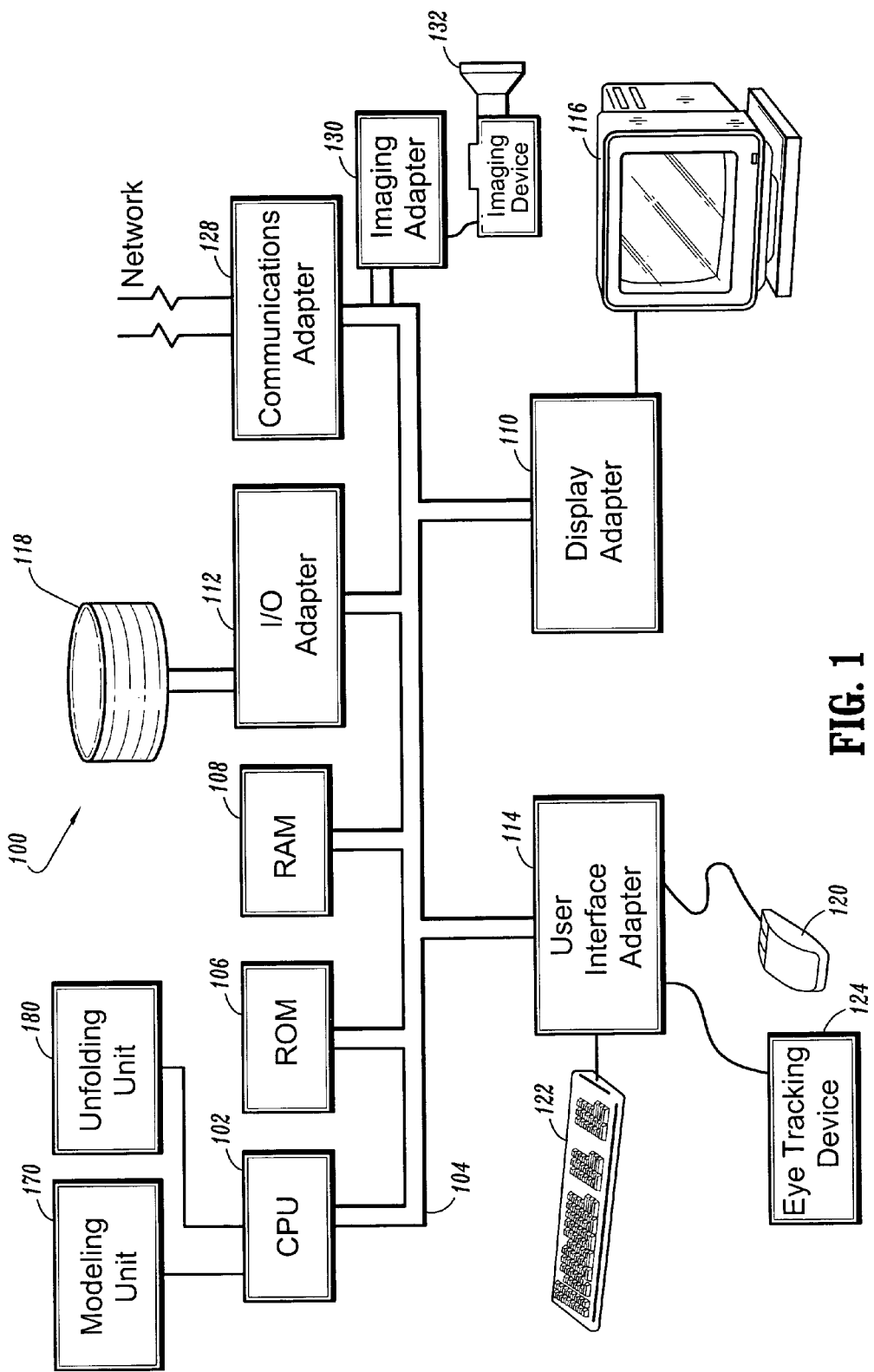
FIG. 1 shows an apparatus for Heart Unfolding for Coronary Visualization in accordance with an illustrative embodiment of the present disclosure.

As shown in FIG. 1, a system for acquisition-time modeling and automated post-processing according to an illustrative embodiment of the present disclosure is indicated generally by the reference numeral 100. The system 100 includes at least one processor or central processing unit ("CPU") 102 in signal communication with a system bus 104. A read only memory ("ROM") 106, a random access memory ("RAM") 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. A magnetic resonance imaging device 132 is in signal communication with the system bus 104 via the imaging adapter 130.

A modeling unit 170 and an unfolding unit 180 are also included in the system 100 and in signal communication with the CPU 102 and the system bus 104. While the modeling unit 170 and the unfolding unit 180 are illustrated as coupled to the at least one processor or CPU 102, these components are preferably embodied in computer program code stored in at least one of the memories 106, 108 and 118, wherein the computer program code is executed by the CPU 102. As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the modeling unit 170 and the unfolding unit 180, as well as the other elements of the system 100, while practicing within the scope and spirit of the present disclosure.

Figure 2:
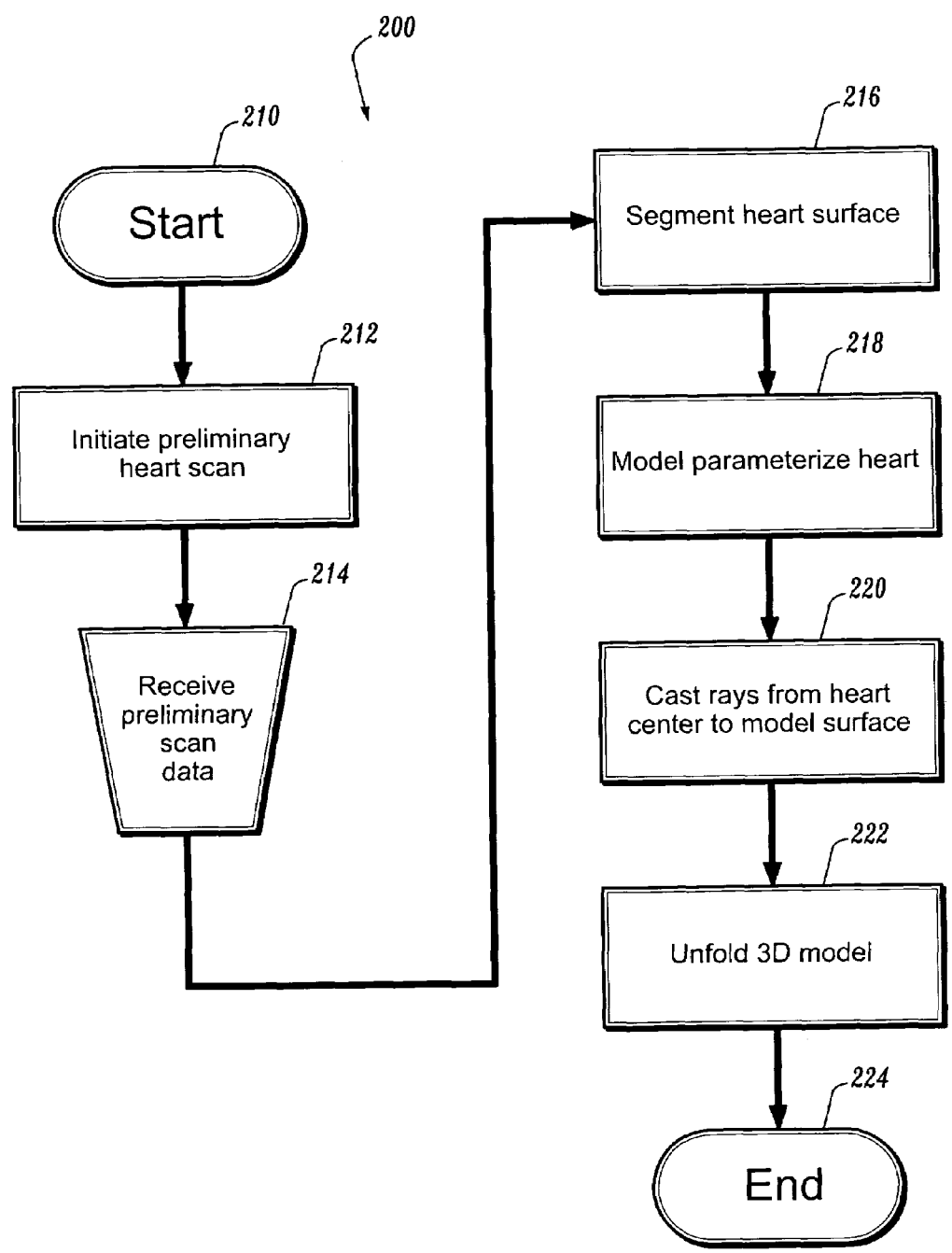
FIG. 2 shows a flowchart for Heart Unfolding for Coronary Visualization in accordance with an illustrative embodiment of the present disclosure.

Turning to FIG. 2, a flowchart for acquisition Heart Unfolding for Coronary Visualization according to an illustrative embodiment of the present disclosure is indicated generally by the reference numeral 200. The flowchart 200 includes a start block 210 that passes control to a function block 212. The function block 212 initiates a preliminary heart scanning session and passes control to an input block 214. The input block 214 receives preliminary heart scan data and passes control to a function block 216.

The function block 216 segments the heart's outer surface and passes control to a function block 218. The function block 218 performs a fixed 3D model parameterization of the heart and passes control to a function block 220. The function block 220 casts rays from the center of the heart to the surface of the 3D model, and passes control to a function block 222. The function block 222 unfolds the 3D model and passes control to an end block 224.

Figure 3:
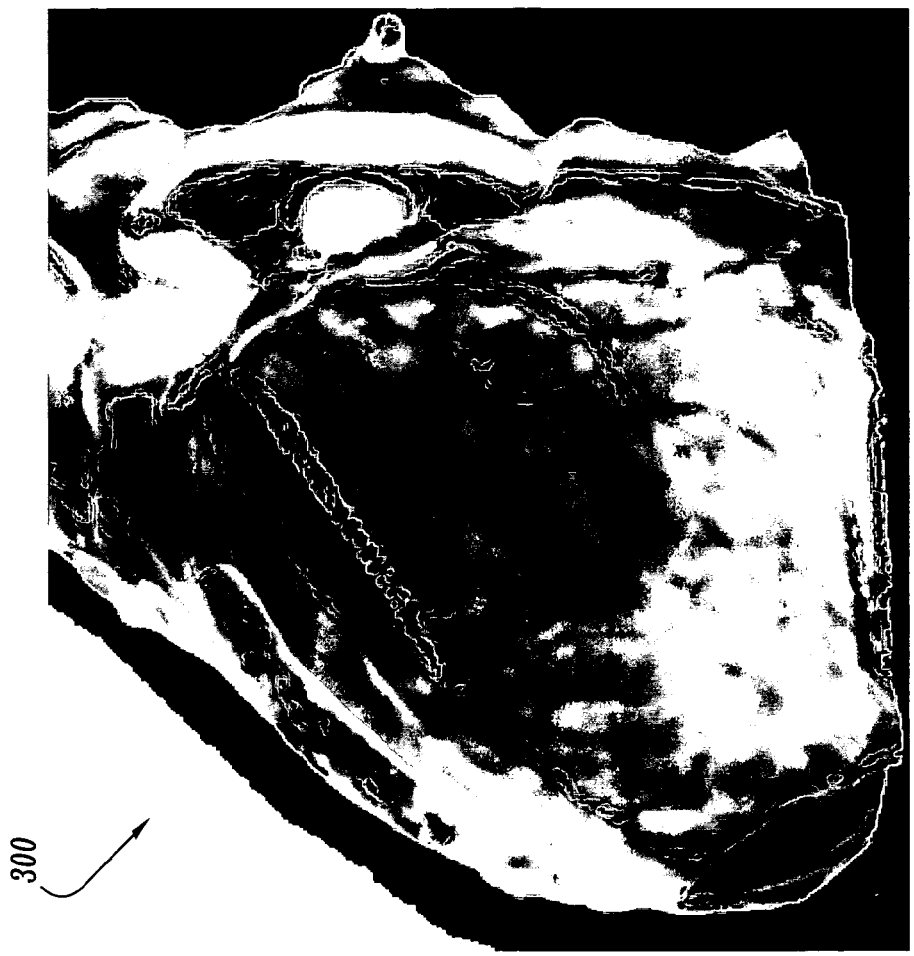
FIG. 3 shows a 3D MIP texture on an isosurface volume in accordance with an illustrative embodiment of the present disclosure.

Turning now to FIG. 3, a 3D MIP texture on an isosurface volume is indicated generally by the reference numeral 300. The 3D MIP texture 300 provides a visualization for heart unfolding.

Figure 4:
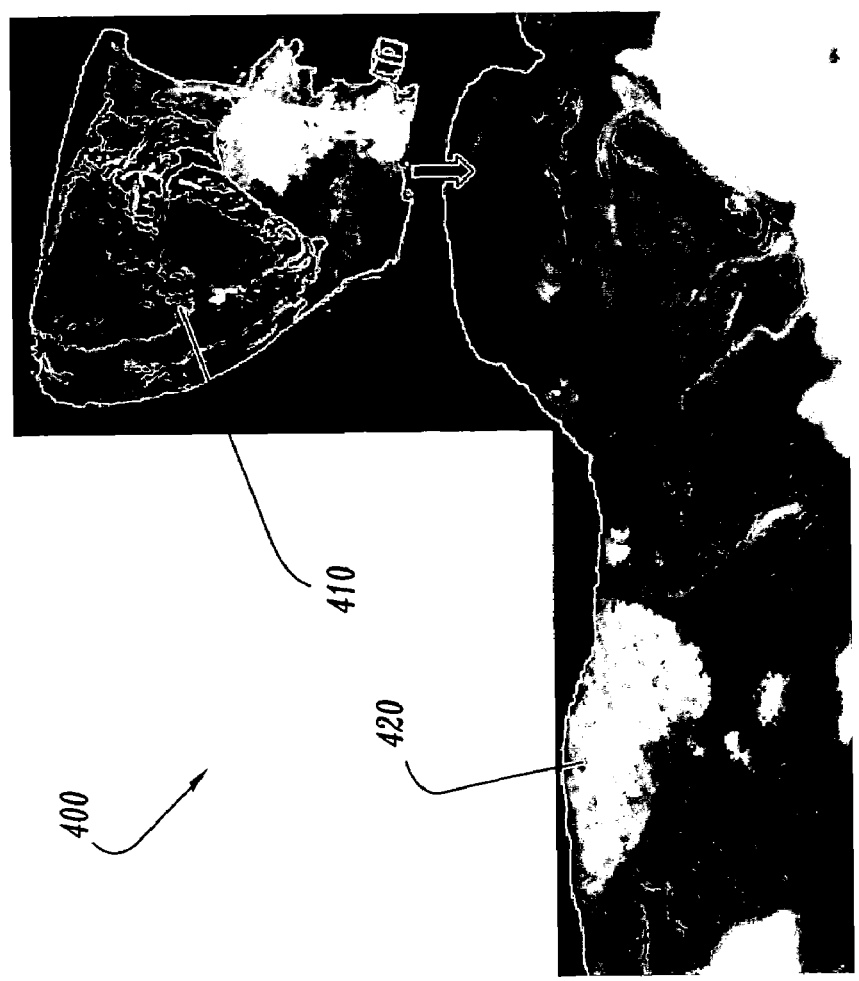
FIG. 4 shows an unfolding visualization in accordance with an illustrative embodiment of the present disclosure.

As shown in FIG. 4, a heart unfolding visualization is indicated generally by the reference numeral 400. Unfolding the surface of the heart brings a new way to visualize the coronaries. The unfolding visualization 400 shows the correlation between an MIP 410 (above) and an unfolded heart surface 420 (below).

Figure 5:
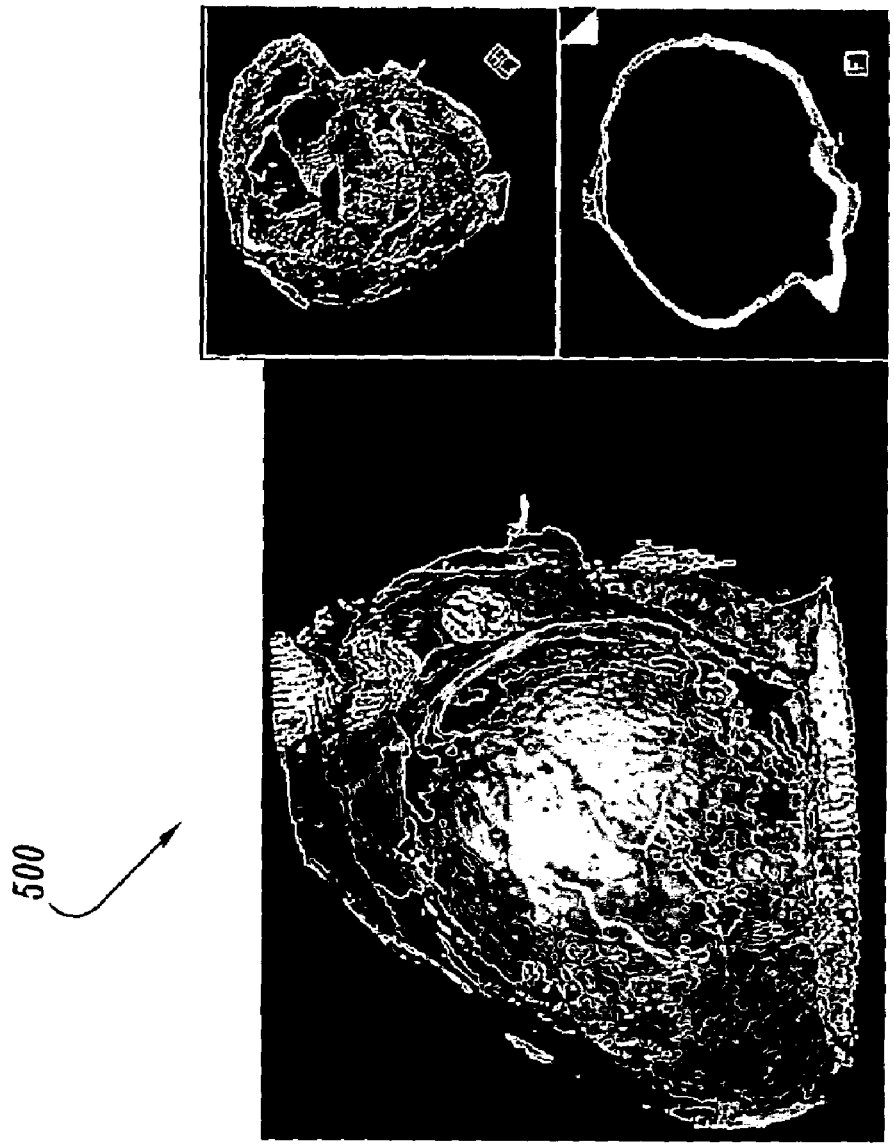
FIG. 5 shows a VRT visualization in accordance with an illustrative embodiment of the present disclosure.

Turning to FIG. 5, a common VRT visualization is indicated generally by the reference numeral 500. In this exemplary embodiment, a graph cut algorithm is used to get a hollow heart volume that will determine the surface to be unfolded. The VRT visualization 500 is shaded by a 3D Syngo card in this example.

Figure 6:
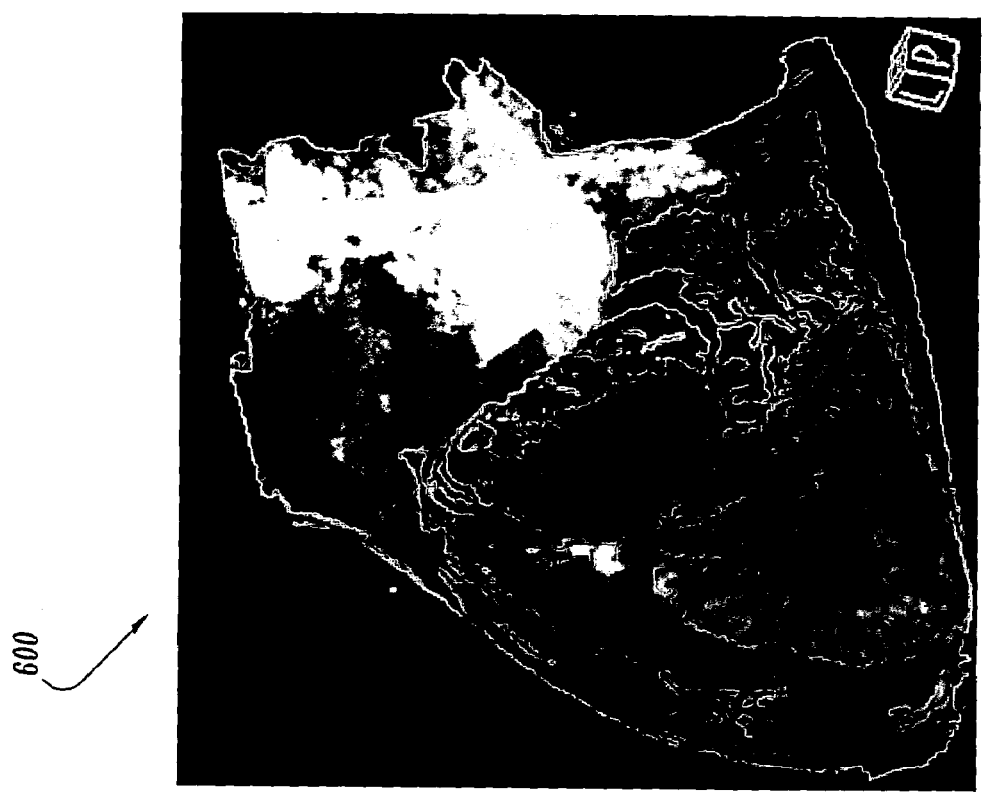
FIG. 6 shows an MIP visualization in accordance with an illustrative embodiment of the present disclosure.

Turning now to FIG. 6, common MIP visualization is indicated generally by the reference numeral 600. Here, the regular MIP view shows that the coronaries are obstructed by bright tissues. The MIP visualization 600 of the thick surface is shown by a 3D Syngo card in this example.

Figure 7:
FIG. 7 shows a 3D model visualization in accordance with an illustrative embodiment of the present disclosure.

As shown in FIG. 7, a new 3D model visualization is indicated generally by the reference numeral 700. The new 3D model visualization 700 shows a 3D MIP texture mapped on an isosurface volume.

Figure 8:
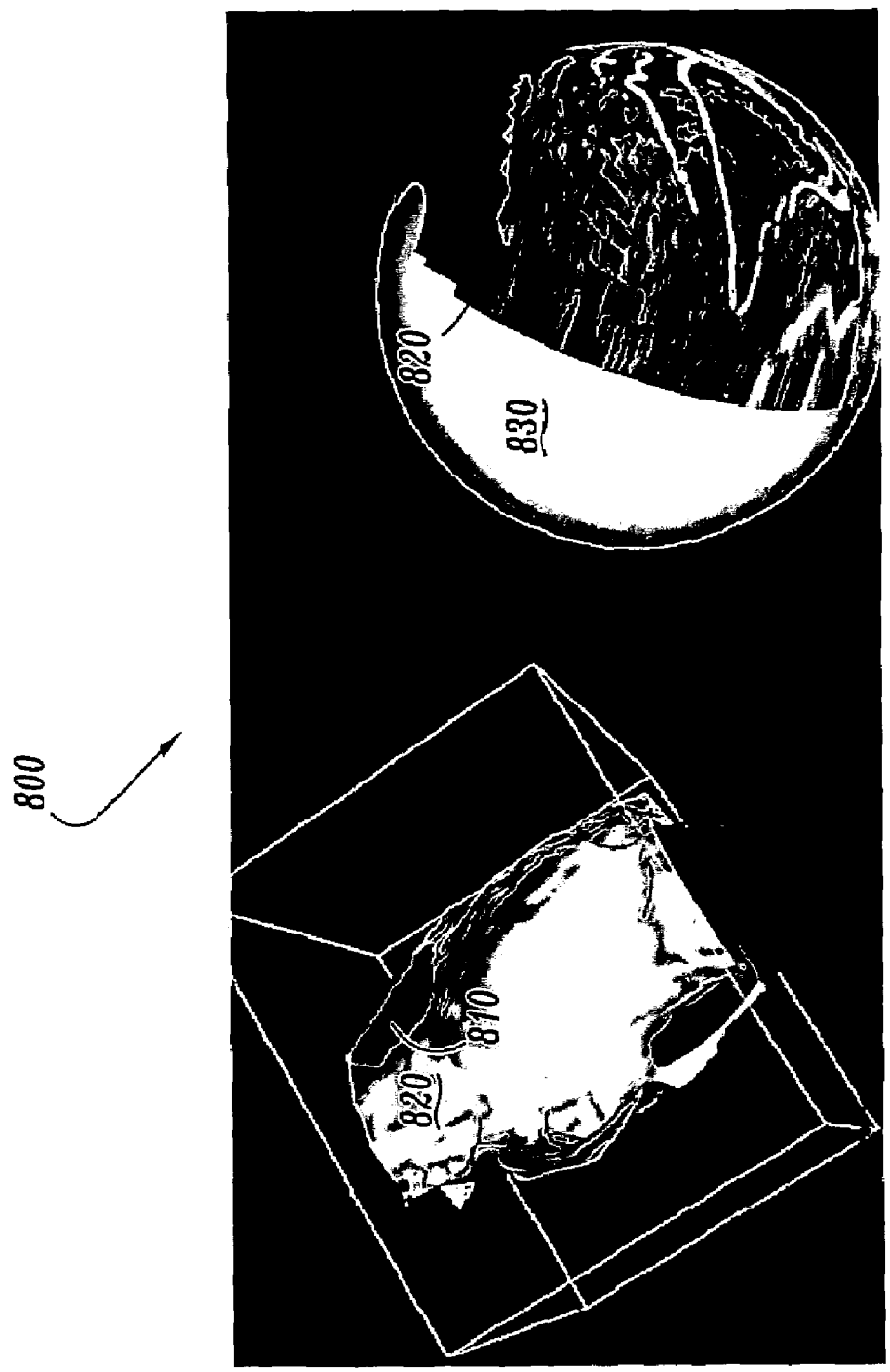
FIG. 8 shows another 3D model visualization in accordance with an illustrative embodiment of the present disclosure.

Turning to FIG. 8, another new 3D model visualization is indicated generally by the reference numeral 800. Here, The new 3D model visualization 800 shows fitting an ellipsoid 810 to the surface of the heart 820, projecting an MIP texture on the ellipsoid 810, visualization of the 3D model, and fitting the ellipsoid 810 (left) or a sphere 830 (right) to the surface of the heart 820.

Figure 9:
FIG. 9 shows yet another 3D model visualization in accordance with an illustrative embodiment of the present disclosure.

Turning now to FIG. 9, a 3D model visualization is indicated generally by the reference numeral 900. The 3D model visualization 900 indicates actual results of an exemplary embodiment heart unfolding method as applied to real data. As will be recognized by those of ordinary skill in the pertinent art, such results have a greater clinical value than was achievable with prior methods.

This exemplary method brings an improved visualization technique for the heart coronaries, as well as vessels on the surface of the heart. The basic principle is to "unfold" the surface of the heart and create a MIP of this unfolded surface. The resulting 2D map of the surface of the heart contains highly contrasted vessels.

Thus, the exemplary technique used for unfolding the surface of the heart is accomplished in four steps: 1) Segmentation of the heart's outer surface; 2) Fixed 3D Model parameterization of the heart; 3) Casting rays from the center of the heart to the surface of the 3D model (MIP filter can be applied here); and 4) Unfolding of the 3D Model.

A graph cut algorithm as known in the art, for example, may be used to segment the outer surface of the heart. From the result of this segmentation, a distance map is created to evaluate the distance from each point on the volume to the segmented surface of the heart. Then, a known 3D model can be fit into the heart so that the surface of the heart fits the surface of the model. After this step, a ray is cast from the center of the heart to the surface of the 3D model. A profile curve is created while the ray propagates through the heart, and a response filter is applied to detect the eventual location of a vessel. If a location is found, then the algorithm displays the result on the surface of the 3D Model. As will be recognized by those of ordinary skill in the pertinent art, the unfolding of the 3D model is a widely-studied problem and several different algorithms can be used.

A preferred embodiment uses a sphere as 3D model and Maximum Intensity Projection (MIP) as the profile curve filter. Although alternate 3D models and ray filters may be used, some may adversely impact the quality of the results.

Thus, preferred embodiments of the present disclosure provide powerful heart unfolding tools for coronary visualization, enabling users to extract significant features and regions-of-interest. Preferred embodiments can serve as very useful acquisition-time modeling and automated post-processing tools in clinical applications.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method using a processor for of organ image unfolding for feature visualization, the method comprising:
   the processor performing the steps of:
   segmenting an outer surface of the organ;
   parameterizing a 3D model of the organ;
   ray-casting from the center of the organ to the surface of the 3D model; and
   unfolding the 3D model of the organ in correspondence with the ray-casting, wherein the organ is a heart.

2. A method as defined in claim 1 wherein the features comprise coronary blood vessels.

3. A method as defined in claim 1, further comprising receiving preliminary organ scan data.

4. A method as defined in claim 1 wherein the 3D model is fixed.

5. A method as defined in claim 1 wherein the 3D model is selected from the group of 3D shapes consisting of a sphere, a cylinder and an ellipsoid.

6. A method as defined in claim 1 wherein ray-casting comprises application of a maximum intensity projection filter.

7. An apparatus for organ image unfolding for feature visualization, comprising:
   segmenting means for segmenting an outer surface of the organ using organ scan data;
   modeling means for fitting a 3D model to the organ scan data;
   ray-casting means for casting rays from the center of the organ to the surface of the 3D model; and
   unfolding means responsive to the ray-casting means for unfolding the 3D model, wherein the organ is a heart.

8. An apparatus as defined in claim 7, further comprising scanning means for receiving the organ scan data.

9. An apparatus as defined in claim 7, further comprising display means for displaying the organ scan data.

10. A system for organ image unfolding for feature visualization, comprising:
    a processor for segmenting an outer surface of the organ using organ scan data;
    an imaging adapter in signal communication with the processor for receiving the organ scan data;
    a modeling unit in signal communication with the processor for fitting a model to the scan data; and
    an unfolding unit in signal communication with the processor for unfolding the 3D modeled scan data, wherein the organ is a heart.

11. A system as defined in claim 10 wherein the processor renders the detailed scan data as a 3D image about a region of interest.

12. A system as defined in claim 11, further comprising a display adapter in signal communication with the processor for displaying the rendered 3D image.

13. A system as defined in claim 12 wherein the display adapter and user interface adapter are usable for checking the scan quality.

14. A system as defined in claim 10 wherein the processor changes the model.

15. A program storage device readable by machine, tangibly embodying a program of instructions executable by the machine to perform program steps for organ image unfolding for feature visualization the program steps comprising:
    segmenting an outer surface of the organ;
    parameterizing a 3D model of the organ;
    ray-casting from the center of the organ to the surface of the 3D model; and
    unfolding the 3D model of the organ in correspondence with the ray-casting, wherein the organ is a heart.

16. A program storage device as defined in claim 15 wherein the features comprise coronary blood vessels.

17. A program storage device as defined in claim 15 wherein the 3D model is selected from the group of 3D shapes consisting of a sphere, a cylinder and an ellipsoid.

18. A program storage device as defined in claim 15 wherein ray-casting comprises application of a maximum intensity projection filter.

* * * * *